United States Patent
Wu et al.

(10) Patent No.: US 10,817,620 B2
(45) Date of Patent: Oct. 27, 2020

(54) SECURING SENSITIVE USER DATA ACROSS HARDWARE AND SOFTWARE COMPONENTS HAVING UNBALANCED TRUST LEVELS

(71) Applicant: MagicCube Inc., Santa Clara, CA (US)

(72) Inventors: Jason Wu, Brisbane (AU); Peter Crosthwaite, Brisbane (AU); Michael Koval, Santa Clara, CA (US); Hesham Shawki, Cupertino, CA (US); Nancy Zayed, Cupertino, CA (US); Shin'ichiro Matsuo, Santa Clara, CA (US); Xi Zhou, San Jose, CA (US)

(73) Assignee: MagicCube, Inc., Santa Clara, CA (US)

( * ) Notice: Subject to any disclaimer, the term of this patent is extended or adjusted under 35 U.S.C. 154(b) by 0 days.

(21) Appl. No.: 16/359,748

(22) Filed: Mar. 20, 2019

(65) Prior Publication Data

US 2020/0065515 A1  Feb. 27, 2020

Related U.S. Application Data

(60) Provisional application No. 62/722,799, filed on Aug. 24, 2018.

(51) Int. Cl.
*G06F 21/62* (2013.01)
*G06F 21/60* (2013.01)

(52) U.S. Cl.
CPC ........ *G06F 21/6245* (2013.01); *G06F 21/604* (2013.01)

(58) Field of Classification Search
None
See application file for complete search history.

(56) References Cited

U.S. PATENT DOCUMENTS

| | | | |
|---|---|---|---|
| 8,990,121 B1 | 3/2015 | Guise et al. | |
| 9,009,468 B1 | 4/2015 | Zayed | |
| 9,367,842 B2 | 6/2016 | Quigley et al. | |
| 2001/0047315 A1* | 11/2001 | Siegel | G06Q 30/02 705/28 |
| 2002/0042831 A1* | 4/2002 | Capone | G06F 16/986 709/230 |
| 2002/0059376 A1* | 5/2002 | Schwartz | H04L 29/06027 709/204 |
| 2002/0188872 A1* | 12/2002 | Willeby | G07F 7/10 726/7 |
| 2008/0148298 A1* | 6/2008 | Chatterjee | G06F 21/53 719/328 |

OTHER PUBLICATIONS

International Search Report and Written Opinion in Application No. PCT/US2019/047855, dated Nov. 15, 2019, 12 pages.

* cited by examiner

*Primary Examiner* — William J. Goodchild
(74) *Attorney, Agent, or Firm* — Goodwin Procter LLP (57) ABSTRACT

Methods, systems, and apparatus, including computer programs encoded on computer storage media, for securing sensitive user data. One of the methods includes receiving a request for user input; providing the request to a remote location; receiving, at a user device, code executable by display hardware to render a user interface configured to receive the user input; capturing information identifying the particular display device locations to which the user provided input on the rendered user interface; and providing the information to the remote location that maps the captured information to user interface information to determine the user input.

20 Claims, 4 Drawing Sheets

SECURING SENSITIVE USER DATA ACROSS HARDWARE AND SOFTWARE COMPONENTS HAVING UNBALANCED TRUST LEVELS

CROSS-REFERENCE TO RELATED APPLICATIONS

This application claims the benefit under 35 U.S.C. § 119(e) of the filing date of U.S. Patent Application 62/722,799, which was filed on Aug. 24, 2018, and which is incorporated here by reference.

BACKGROUND

This specification relates to securing sensitive user data across hardware and software components.

Conventional hardware-based solutions for authentication and secure data storage and transfer often require complex, customized circuitry and are slow to deploy because of design constraints, hardware incompatibilities across devices, prolonged lead times, manufacturing delays, and other roadblocks. Existing hardware-based security solutions differ greatly across various mobile and other devices leading to increased complexities in the market due to the need for different approaches based on the specifics of the chip-based or SIM-card-based technologies. The complexity of the problem is compounded when a software application must target all permutations of operating system and hardware-based solutions to guarantee secure functionality and operation. The increased complexity results in incorrect implementations by that expand the attack surface and vulnerabilities by hackers and attackers.

SUMMARY

This specification describes technologies for securing user input across hardware components. In some implementations, a system uses an isolated runtime environment to secure an acquisition of sensitive user input on a device, e.g., a mobile device or internet-of-things ("IoT") device, that may or may not be trustworthy. Such an isolated runtime environment, along with other system components, can be used to resist tampering and allow for the detection of subversion attempts.

In some implementation, the system includes a cryptographic input device implemented by an emulated secure runtime environment ("SRE") for securely receiving user input through a physical input device connected to a host device such as a mobile phone, e.g., a touchscreen, display keypad, or other input device integrated into or peripheral to the host device, and securely interpreting such input. The cryptographic protocol can use multiple sanctioned cryptographic algorithms, e.g., symmetric and asymmetric cryptography and/or proprietary encryption algorithms and protocols. The cryptographic input device is driven by a cryptographic protocol that exerts control over the input device's functionality as well as over any data exchange communications between the backend cloud component and the input device. In particular, a trusted backend component can provide the user interface for receiving user input in a manner unknown to the SRE. Although the SRE manages data related to user input and interactions, it cannot map such data to the specific eventual content captured by the user interface elements, e.g., displayed number keys, as a consequence of the SRE's unawareness of the specifics of the user interface elements.

In general, one innovative aspect of the subject matter described in this specification can be embodied in methods that include the actions of receiving a request for user input; providing the request to a remote location; receiving code executable by a graphical processing unit to render a user interface configured to receive the user input; capturing information identifying the particular display device locations to which the user provided input on the rendered user interface; and providing the information to a remote location that maps the captured information to user interface information to determine the user input.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

In general, one innovative aspect of the subject matter described in this specification can be embodied in methods that include the actions of receiving a request for user input; providing the request to a remote location; receiving code executable by a graphical processing unit to render a user interface configured to receive the user input; capturing information identifying the particular display device locations to which the user provided input on the rendered user interface; and providing a representation of the captured information to a secure card reader device for validation of the user input.

The subject matter described in this specification can be implemented in particular embodiments so as to realize one or more of the following advantages. The system described in this specification overcomes some of the shortcomings of existing systems where the security of the application is inherently dependent on the integrity and security of the underlying operating systems.

The SRE provides a separate runtime environment for sensitive code, data, and logic to execute in that is more resistant to tampering. The SRE also shields the sensitive code and logic from the high-level API of the native operating system. As such, the sensitive code and data are reasonably protected from common vulnerabilities and exposures as well as zero-day attacks since they are presented with a comparable set of services to securely compute without exposure to such vulnerabilities. Because the SRE operates in a non-privileged space, it is fully under the control of the application provider. As such, an operator or provider of the application has full flexibility and control over the application's security and is free to update the application's security posture independently of the operating system's vendor as well as of the original equipment manufacturers ("OEM's") update cycles.

Because applications using the SRE execute on digital devices that lie beyond an enterprise's security perimeter and can change its trust level multiple times throughout a single day, the protocols and flows implemented by the SRE enable security and risk systems within the enterprise to get real-time evaluation of the security of the instance prior and during the execution of the sensitive operation thus giving the application a proactive security posture rather than a reactive one. The integrity of the SRE is evaluated internally as well as by an external remote source of trust, e.g., a SRE backend system prior to allowing the SRE to capture user input for a particular application.

In some conventional systems, soft keyboards provided by the operating system's provider inherit vulnerabilities of the operating system. Further, custom soft keyboards are difficult to install and operate. The system described in this specification offers a non-native soft keyboard rooted in the SRE and operated by the SRE backend that increases the difficulty of subversion given the modified, alternate runtime environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
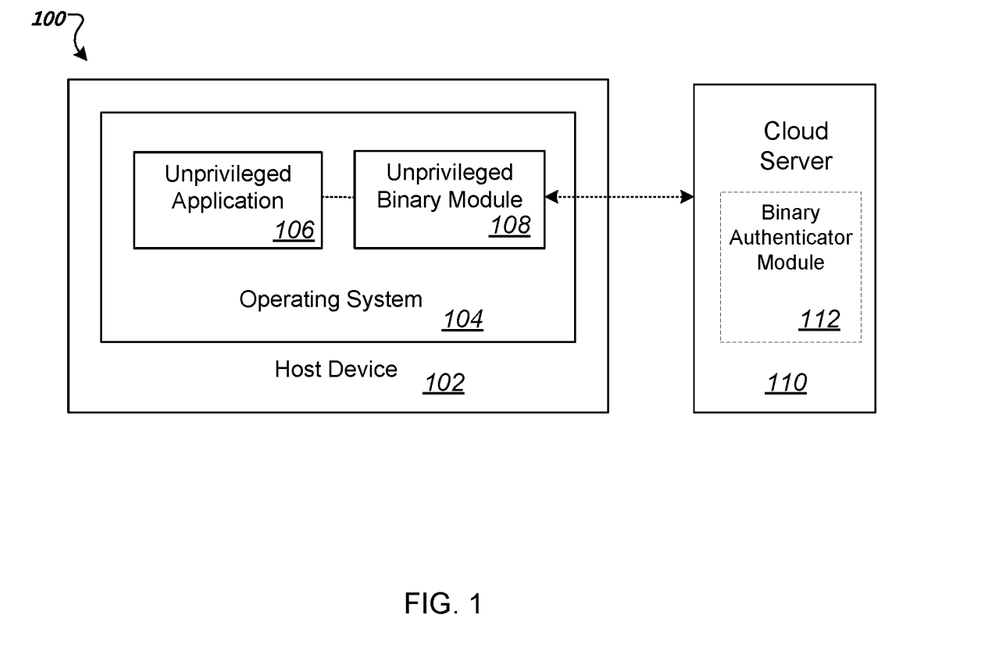
FIG. 1 is block diagram of an example system that secures user input across hardware components.

FIG. 1 is block diagram of an example system 100 that secures user input across hardware components. The system 100 illustrates a high-level architecture that includes a host device 102 communicatively coupled to a cloud server 110, e.g., using a computer network. The host device 110 can be any suitable device including a mobile device, e.g., a smartphone, tablet, or laptop, or other computing device. The host device 100 includes an operating system 104 that can be used to execute various applications installed on the host device 110.

The operating system 106 can also be used to execute an unprivileged application 106. An unprivileged application is an application without administrative or other elevated privileges to the host device. The unprivileged application 106 executes on the operating system 106 and communicates with an unprivileged binary module 108. The unprivileged application 106 can communicate with the unprivileged binary module 108, for example, by static or dynamic linking. In particular, an application programming interface ("API") can be used to allow the unprivileged application 106 to use the services of the unprivileged binary module 108. The services provided by the unprivileged binary module 108 can include one or more of cryptographic operations, manipulation of sensitive data assets, verification of environment, or authentication.

The unprivileged binary module 108 can also instantiate an emulator to create a secure runtime environment ("SRE"). In particular, the emulator can be configured to implement the functionality of a hardware architecture, e.g., a processor having a particular instruction set, different than a hardware architecture of the host device 102. The SRE can be integrated into or run within an environment that can vary its trust level. Trust can refer to a confidence that the particular system or module has not been tampered with and is performing as specified. For example, trust that the SRE has not been compromised in some way by a malicious entity. Emulated environments such as the SRE will be described in greater detail below.

In some implementations, the environment that can vary the trust level of the SRE is provided by the cloud server 110. The cloud server 110 provides a backend cloud component that acts as a source of trust for the SRE and a binary authenticator module 112. The binary authenticator module 112 acts as the security counterpart of the SRE and its backend cloud component, and is integrated into or runs within an environment that is trusted directly by the backend cloud component or indirectly through a delegate of the cloud component.

In some implementations, the binary authenticator module 112 is integrated with the backend cloud component on the cloud server 120. In some other implementations, the binary authenticator module 112 is distinct from the cloud server 110, e.g., as a separate computer system, but in communication with the cloud server 110.

The components of the system 100 have varying levels of trust. The backend cloud component provided by the cloud server 120 has the highest level of trust and is the anchor that builds trust to the other system components. Each component is assigned a different trust level based on its runtime and operational environment. The trust level is a function of the component's physical proximity to an adversary. For example, in some implementations, the backend cloud component can have trust level TL-0.

In some implementations, the SRE is the least trusted even though the SRE itself represents a more secure, separated, runtime environment in the memory of an application or program that runs on the host hardware and operating system. For example, the SRE can have trust level TL-2. Additionally, in some implementations, the SRE can initially have no trust level prior to particular authentication operations including those by the cloud server 110.

The binary authenticator module 112 can have a higher trust than the SRE as it is more remote to a potential adversary on the host device 102 than the SRE. For example, the binary authenticator module 112 can have trust level TL-1.

The security put in place can vary depending on the level of trust. For example, the lower level of trust for the SRE can mean that it is not provided with as much information and is directed to some extent by the cloud server having a higher level of trust, as described in greater detail below.

Figure 2:
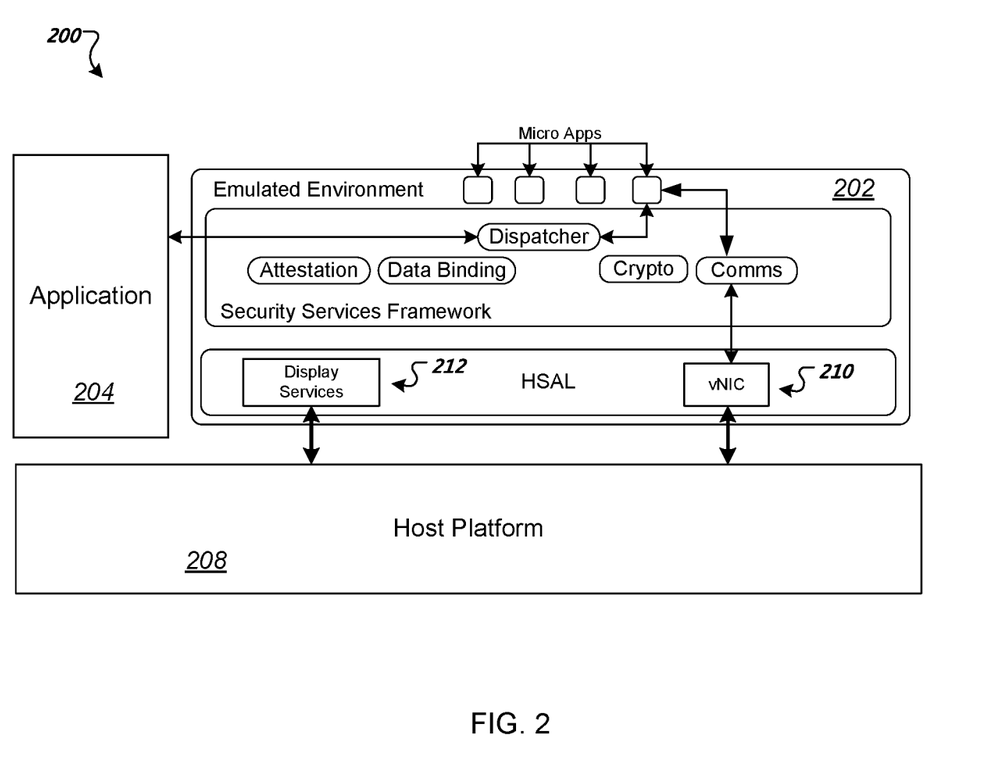
FIG. 2 is a block diagram of an example host device where an application making use of the system is depicted.

FIG. 2 is a block diagram of an example host device 200. Host device 200 may be similar to host device 102 of FIG. 1. In particular, FIG. 2 illustrates components of the host device 200 in greater detail. The host device 200 includes host platform 208, application 204, and emulated environment, e.g., SRE, 202.

The host device 200 can be a mobile or other device, e.g., a smartphone, smart watch, smart glasses, tablet computer, smart television, gaming device, IoT devices for smart grids, IoT devices for smart cities, music player, mobile telephone, smart or dumb terminal, network computer, personal digital assistant, wireless device, information appliance, or other computing device that is operated as a general purpose computer or a special purpose hardware device that can execute the functionality described in this specification.

The host platform 208 includes device hardware and native software, for example, a native operating system. The native operating system can be a mobile, cloud-based server, or other operating system, e.g., an Apple iOS® platform, a Google Android™ platform, a Linux® operating system, or variants of a UNIX® operating system.

The device hardware of the host platform 208 can include one or more processors, memories and storage devices, networking components, and input/output devices. The one or more processors are suitable for executing computer instructions retrieved from the memories. One or more memories can store instructions that, when executed by a processor, form the modules and other components described herein and perform the functionality associated with the components. The memories suitable for embodying computer program instructions and data include all forms of non-volatile memory including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The input and output hardware can include a display device, keyboard, mouse, or other suitable input devices. In particular, in some implementations, the input and output hardware is a touchscreen display that allows for both the output display and input. For example, the touchscreen display can present various user interfaces associated with corresponding applications or the operating system. These user interfaces can include elements that interact with the touchscreen hardware to receive user input to the interface.

Various software applications can be stored on the host device 200 or accessed from a remote location by the host device 200 using suitable networking hardware and communication protocols. The software applications include mobile application 204.

Application 204 can be in the form of a standalone application, plugin, component, module, library—statically or dynamically linked—, or other software object. The mobile application 204 can call or otherwise execute a framework or application programming interface (API) that provides for the creation and communication with an emulated environment 202 on the host device 200. For example, the framework or API can be provided in a library that is linked with or imported into the application 204. The application 204 can make a call into the framework, which instantiates the emulated environment 202 on the host device 200.

The emulated environment 202 can include emulated hardware and emulated software, such as an emulated guest operating system. Emulation refers to the use of a computer program or hardware to provide the functionality of other software or hardware. The emulated hardware can include one or more emulated processors, such as emulated central processing unit (CPU), emulated memories and other storage mediums, emulated input and/or output devices, emulated communications ports and other interfaces, and so on. A software-based emulator can also emulate a particular hardware architecture than the architecture of a host device on which the emulator executes. For example, an emulator can be configured to emulate an integrated circuit, e.g., a CPU, that has a different instruction set architecture (ISA) than a physical integrated circuit of the host device. Moreover, different types of emulated environments can be generated to each have a different ISA. Thus, the emulated environment instantiated on one device may have a different ISA than an emulated environment instantiated on another device.

The emulated guest operating system can be configured to communicate with the native operating system through an emulated network interface 210 of the emulated environment 202. In some implementations, communication is accomplished by attaching a guest operating system process to the emulated network interface and using the attached process to transfer data (using, e.g., transmission control protocol (TCP) packets, user datagram protocol (UDP) datagrams, internet protocol (IP) packets, and/or other network messages) between the emulated network interface and the network stack of the native operating system. The attached process can execute in kernel space or user space of the guest operating system. In some implementations, virtual-network kernel devices, such as network tunnel and/or network tap (TUN and/or TAP), are used to provide simulated network and link layers to facilitate communication between the guest and native operating systems.

The emulated environment can also be configured to communicate with the host platform 208 using display services 212. For example, the display services 212 can be used to communicate data for rendering and display by hardware display devices of the host platform 208.

The emulated guest operating system can also communicate with one or more remote systems, e.g., cloud server 110 of FIG. 1, using the emulated network interface and network stack of the native operating system, rather than using typical native runtime frameworks and APIs associated with the native operating system. In some implementations, the guest operating system communicates through a virtual network adaptor that creates a secure tunnel to a remote system. Communication between the host device 200 and remote systems can take place, for example, over media such as standard telephone lines, LAN or WAN links, e.g., T1, T3, 56 kb, X.25, broadband connections, e.g., ISDN, Frame Relay, ATM, and/or wireless links, e.g., 802.11 (Wi-Fi), Bluetooth, ZigBee, Z-Wave, GSM, TD-CDMA, TD-SCDMA, CDMA, SMS over radio, fiber optics, or other suitable transmission media. The network can carry, e.g., TCP/IP protocol communications, HTTP/HTTPS transmissions, etc., and the connection between the user device 200 and the remote systems can be communicated over such TCP/IP networks. Further, the communication between the host device 200 and the remote system can be encrypted/decrypted using known and/or custom encryption/decryption algorithms.

In some implementations, authorized access for certain embedded and mobile clients and backend/cloud servers can be accomplished through secure frameworks or APIs that implement opaque data models. In some instances, the application 204 is not permitted to use services provided by the emulated environment 202 until after a combination of the application 204 and the host device 200 have been validated as a legitimate user platform. For example, if an end user is instructed by his service provider, e.g., bank, merchant, medical institution, to download an application that uses services provided by the emulated environment 202, and the emulated environment 202 subsequently detects that the host device 200 is compromised, e.g., is jail-broken, has questionable software, etc., then the emulated environment 202 can refuse to allow the application 204 to access the services provided by the emulated environment 202.

The emulated environment 202 can execute one or more services. The services can include, but are not limited to, secure input/output, virtual private network (VPN) communication, storage, key management, Quick Response Code (QRC) management, near field communication (NFC), host card emulation (HCE), payment token management, malware protection, virus detection, and other security and storage services.

In some implementations, the emulated environment 202 provides an SRE that executes in a sandbox process having a controlled set of resources, e.g., memory, storage space, processors, processor cycles, etc., that can be accessed by the emulated environment 202. The sandbox can be, for example, a mechanism or space for running programs or executing instructions such that access by software executing inside the sandbox to software and/or hardware outside the sandbox is restricted.

Unlike a standard operating system, the emulated environment can ensure that applications running within are unable to access the hardware of the host device. These constraints create a fully secure environment and container that shield the emulated device from unauthorized external accesses, and shield the native environment of the host device from unauthorized access by the emulated device. In particular, the emulated device provides an encrypted environment that shields the sensitive internal applications from external tampering.

Additional details regarding the structure and execution of emulated environments on a host device can be found in U.S. Pat. No. 9,009,468, which is incorporated here by reference.

The system can be used to secure user input across hardware and software components having unbalanced trust levels. In particular, the emulated environment, and in particular an SRE, can be used to secure the acquisition of sensitive user input on a device that may or may not be trustworthy.

For example, a mobile application can be associated with a financial institution. In order for the user to carry out particular interactions with the mobile application, a user input such as a personal identification number (PIN) may be required. However, the input to the device hardware may not be secure. For example, the user input to a user interface keypad presented on a touch screen interface may be vulnerable to interception by malicious entities.

As described below with respect to FIGS. 3-4, the SRE can work with remote components including the backend cloud component and binary authenticator module to generate a secure cryptographic input device for capturing user input on the device for a given third party application.

Figure 3:
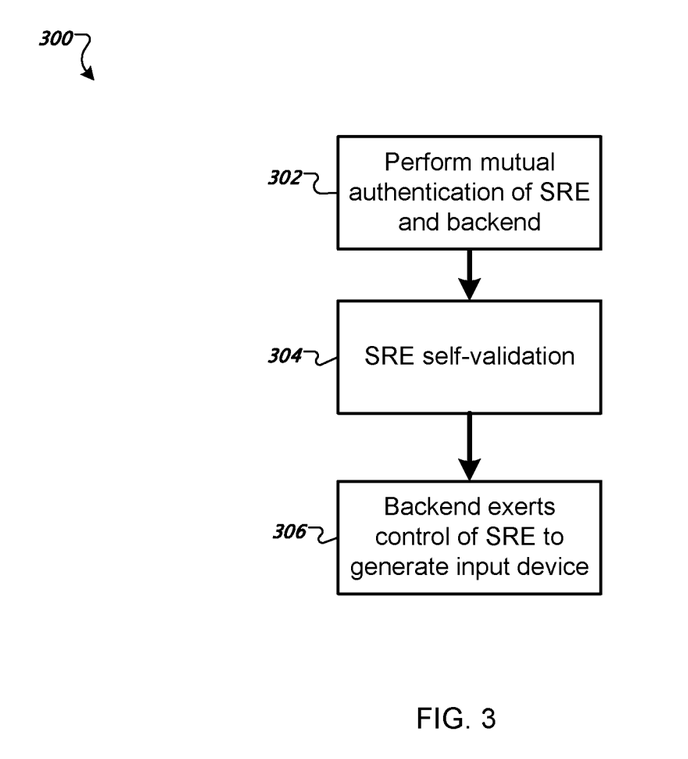
FIG. 3 is a flow diagram of an example process for authenticating a secure runtime environment.

FIG. 3 is a flow diagram of an example process 300 for authenticating a secure runtime environment for execution. For convenience, the process 300 will be described as being performed by a system of one or more computers, located in one or more locations, and programmed appropriately in accordance with this specification. For example, components of the system 100 of FIG. 1, appropriately programmed, can perform the process 300.

The SRE must be executed before a cryptographic input device can be provided to capture use input for an application. In some implementations, the user device and SRE are considered to have no prior trust relationship to the backend cloud component. Therefore, a trust relationship is established prior for a given operation, e.g., for each individual transaction initiated by the application. This trust relationship allows the backend cloud component to trust the SRE, which allows the two to interact to both facilitate the requested operation and to provide a chain of custody for steps in the operation that ensure the operation was free from outside tampering.

The system performs mutual authentication of the SRE and the backend cloud component (302). This authentication can include one or more requests and responses, e.g., handshake messages or other authentication protocols, to provide mutual authentication of the SRE and the backend cloud component. In some implementations, the authentication includes performing operations associated with particular cryptographic calculations that can only succeed when both the SRE and the backend cloud component are authentic. This can provide for authentication for a particular instance. Thus, when executing the SRE at a later time, the process must be repeated as the prior validation will no longer succeed.

The SRE performs further self-validation operations (304). The self-validation can include internal checks of the emulation environment as well as checks related to its operational environment. In some implementations, a runtime print is generated and provided to the backend cloud component. The runtime print can be used by the backend cloud component to apply security controls and policies for the SRE. In some implementations, the runtime print is a cryptographic representation of the operational environment. Changes to the operation environment, e.g., responsive to malicious activities, would change the runtime print, thereby invalidating the SRE operation. Completion of the SRE authentication and validation operations can allow the backend cloud component to assign a level of trust to the SRE.

In response to an application request, the backend cloud component exerts control over the SRE (306). In particular, the backend cloud component, being the most trusted, can exert control over the services provided by the SRE. For example, the backend cloud component can control the creation of a particular input device by the SRE for use to provide a service to the application. Using such an SRE generated input device for capturing user input is described with respect to FIGS. 4 and 5.

Figure 4:
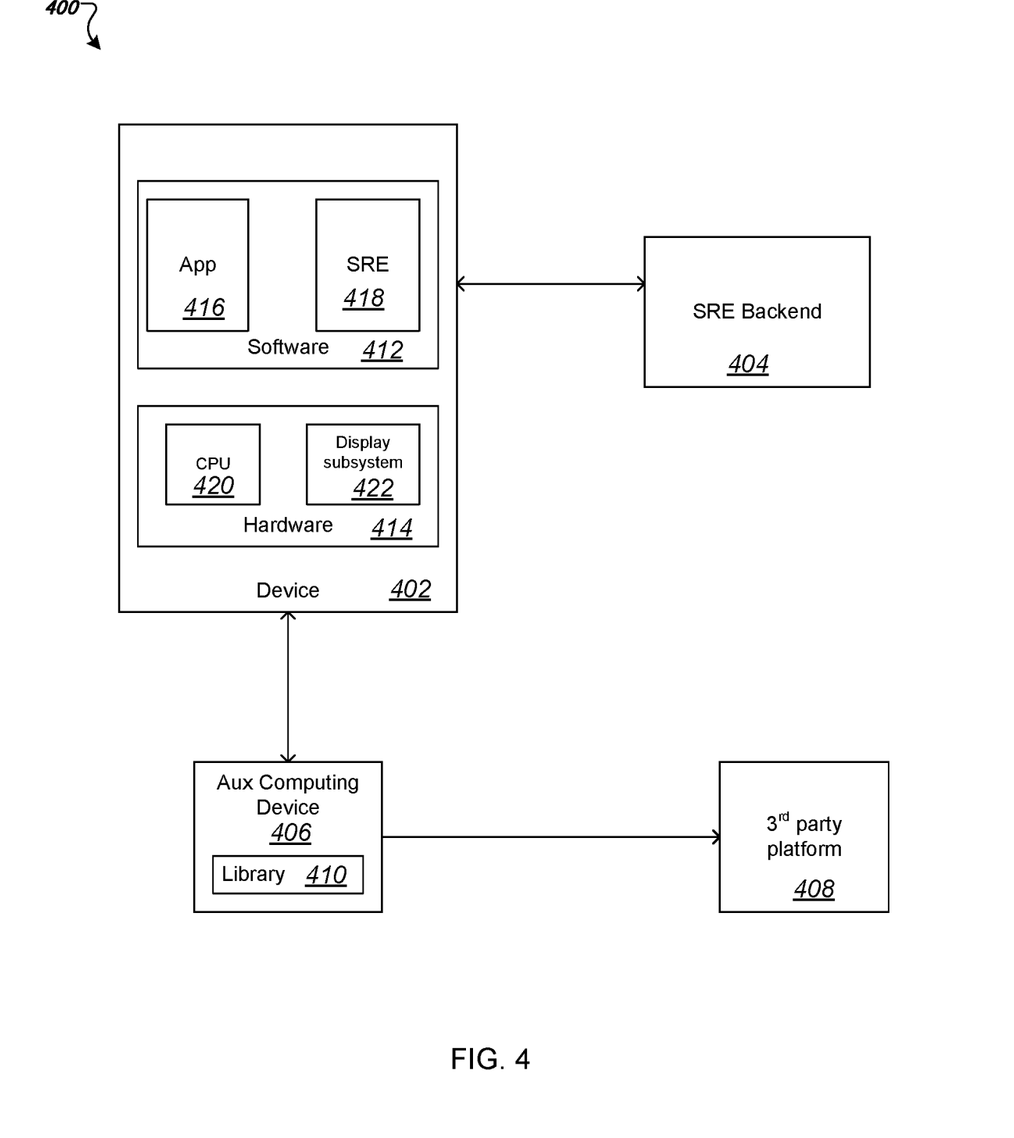
FIG. 4 is a block diagram of an example system for capturing input.

FIG. 4 is a block diagram of an example system 400 for capturing input. In particular, system 400 illustrates an example system in which a device 402 interacts with both a SRE backend 404 and an auxiliary computing device 406 to perform particular transactions. For example, the auxiliary computing device 406 can be a secure card reader while the device 402 is a mobile phone. When combined, information about a given transaction can be provided by the auxiliary computing device 406 to a third-party platform 408, e.g., a payment processing platform.

The auxiliary computing device 406 can include a chip reader, a magnetic stripe reader, or a contactless reader that captures information from a physical card presented by the user, e.g., a credit or debit card. Typically, such auxiliary computing devices include firmware that provides secure capture of the information as well as secure communication to the third-party platform 408. The auxiliary computing device 406 also includes library 410. Library 410 includes information provided by the SRE backend 404, for example, for incorporation during manufacture of the reader device, that can be used to interpret communications received from a device in communication with the SRE backend 404, as described in greater detail below.

In some instances, a transaction requires both the card information, e.g., a card number, and a user input identifier, e.g., a PIN number. For example, particular transactions that exceed a specified monetary value can require a PIN input to complete in order to reduce the likelihood that the transaction is fraudulent. However, the auxiliary computing device may not have a keypad for entering the PIN.

The device 402 can be a touchscreen device including a mobile device or point of sale kiosk. The device 402 includes both software 412 and hardware 414. The software 414 includes an application 416 and a SRE 418. The application 416 and SRE 418 can be similar to the application and SRE described previously. In some implementations, the SRE can be tied to the application so that the SRE is specific to the particular application and used to facilitate operations of the application. For example, the application can communicate with the auxiliary computing device 406 to facilitate a transaction or other operation. For example, a user of the device 402 can interact with an interface provided by the application to set up the transaction, e.g., to select a particular product or service for purchase or to confirm items identified for purchase received by the device 402.

The application 416 can communicate with the auxiliary computing device 406, for example using Bluetooth or other wired or wireless communication, to perform the payment portion of the transaction, e.g., capture of the card information for transmission to the third-party platform 408.

When additional information is required from the user to complete the transaction, e.g., PIN entry, the SRE 418 facilitates secure display of an entry interface and transmission to the auxiliary computing device 406. For example, after establishing the trust relationship for the SRE to interact with the SRE backend 404, e.g., as described above with respect to FIG. 3, the SRE backend 404 can provide code to the SRE 418 for generating an input interface for display. In particular, the SRE backend 404 can provide the code in a form directly executable by a display subsystem 422 to render the input interface on a display device. As such, the SRE 418 does not interpret or process the code and just passes it to the display subsystem 422. The display subsystem 422 can include both display hardware, e.g., a liquid crystal display, as well as hardware for processing code to interpret display instructions, e.g., a graphical processing unit. In some implementations, a single display device can perform both functions. Consequently, the SRE 418, which is less trusted than the SRE backend 404, does not know what the content of the software input device interface provided by the SRE backend 404 contains. For example, the software input interface can be a numerical keypad, standard or non-standard, but can vary depending on the nature of the intended sensitive input to be captured as correlated and decided by the supplied code from the SRE backend 404. However, the nature of the input device for receiving unique user input is not limited to a numeric or alphanumeric interface.

The SRE 418 captures the input entered to the presented user interface. For example, in a touch interface, the display hardware registers touch contact at particular coordinates of the display screen. The SRE 418 obtains these coordinates. However, the SRE, since it does not have information on the layout of the user interface, does not know what PIN or other user identifier the coordinates correspond to. In other words, a user touching a number "6" on the user interface results in a coordinate information, but the SRE cannot map that coordinate information to the number "6". This provides a layer of security to the input since even if a malicious party were able to capture the coordinates of the input it would be unable to determine what they correspond to. Similarly, even if the SRE 418 is compromised, there is insufficient information to determine the input values of the user interface form the data collected by the SRE 418.

The SRE 418 packages the input information to provide to the reader device 406. This can include a representation of the coordinate information as well as security information indicating that the transaction was secure. This can, for example, provide a chain of custody for the operations of the SRE to ensure that the entire process was carried out securely. The auxiliary computing device 406 uses the library 410 to map the coordinates to characters of the presented user interface in order to construct the input identifier. In some implementations, the auxiliary computing device 406 can verify the identifier and, in response to a match, communicate the transaction details to the third-party platform 408.

Additionally, while the SRE generally uses a central processing unit (CPU) 420 or other device processor to execute functions of the SRE, by separating the user input execution solely to the display subsystem 422, an attacker would need to target multiple processors and devices on main device 402. This can provide an extra layer of security to the input capture.

Figure 5:
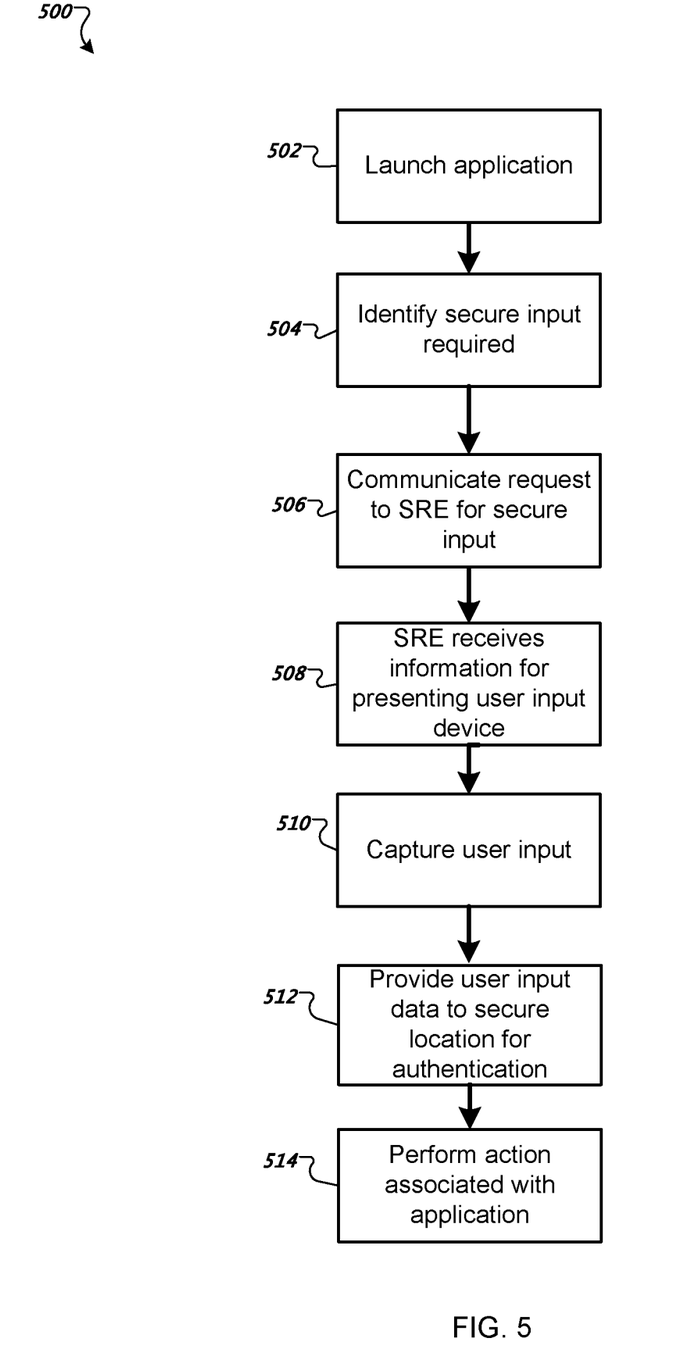
FIG. 5 is a flow diagram of an example process for securely receiving user input.

FIG. 5 is a flow diagram of an example process 500 for securely receiving user input. For convenience, the process 500 will be described as being performed by a system of one or more computers, located in one or more locations, and programmed appropriately in accordance with this specification. For example, components of the system 100 of FIG. 1, appropriately programmed, can perform the process 500.

The host device launches an application (502). For example, the application can be a third party mobile application installed on the host device by a user of the host device. The host device can launch the application in response to user input to the host device. For example, using smartphone with a touchscreen interface, the user can launch the application by toughing an icon representing the application.

The launched application determines that a secure input is required (504). The secure input can be determined based on a need to log-in the user to a system associated with the application or to authenticate the user to perform a particular operation. For example, the application can be associated with a financial institution. Particular user interactions may need to be authenticated such as accessing financial statements or conducting a financial transaction. In other scenarios, the host device can be part of a point of sale consumer transaction alone or in combination with other devices such as a card reader device. In some implementations, the technology can be used to secure user input in other situations, for example, requiring user input of a code or other identifier to obtain access to particular data.

The application communicates a request regarding the secure input to an SRE, e.g. the SRE 418 of FIG. 4 (506). For example, as described above, the application can use an API to request services from the SRE. The request can be, for example, a request to capture user input and provide the input to a secure location for authentication. In some implementations, the request is in response to a determination by the application that the type of action being performed requires additional user input, e.g., the input of a unique identifier such as a PIN or other unique code.

The SRE communicates with the backend cloud component, e.g., SRE backend 404 of FIG. 4, to receive information for displaying a secure input device uses the native hardware display (508). In particular, the backend cloud component can provide code that the SRE pushes directly to a display subsystem on the host device. The display subsystem can then render the secure input device, e.g., as a UI keypad or other input interface. The SRE does not process the received code and therefore does not have access to the particular characteristics of the input device, e.g., the locations or layout of the displayed user interface elements such as a numerical keypad. Additionally, the layout of the generated user interface can vary depending on the particular code sent by the backend cloud component. Presenting a cryptographic input device originating from the backend cloud component and delivered by the SRE to the display subsystem avoids using platform provided input devices which have a lower trust and may not be secure.

The SRE captures the user input to the presented input device (510). The user can provide input in a similar manner to how they would provide input to a platform provided input device. For example, the input device can include a user interface presenting a numerical or alphanumeric display for capturing touchscreen input on the host device. The user can enter the requested authentication information, for example, a PIN number to the presented input device. The SRE registers all user actions and interaction with the secure input device displayed to the user and, however, as noted above, the SRE does not know what user interface elements are displayed and what the registered user interactions corresponds to because it lacks the context of the displayed software input device. This helps secure the user's input from being captured. Additionally, since the particular input device interface may be selected by the backend cloud component from a set of different input device interfaces, an attacker would need to know which particular user interface was used to confidently intercept the user's input PIN or other code.

The SRE provides the user input data to secure location for authentication (512). The input data can be processed for transmission to provide additional security. For example, the user interactions can be encoded in a manner that can only be decoded by the intended recipient, e.g., a specific card reader device. However, even if the coordinates were sent without encryption and captured, it may not provide enough information to determine what user input was provided since it is unknown what the coordinates correspond to.

In some implementations, the SRE uses the host device to transmit the user input data to an auxiliary computing device such as a secure card reader device. The transmitted user input data can include a representation of the interaction information as well as security information indicating that the transaction was secure. This can, for example, provide a chain of custody for the operations of the SRE to ensure that the entire process was carried out securely.

The auxiliary computing device uses the information about the touch coordinates to construct the corresponding user input, e.g., the input PIN number. The auxiliary computing device can include data provided by the backend cloud component that allows the auxiliary computing device to determine the corresponding elements of the particular user interface presented on the host device.

In some alternative implementations, the SRE uses the host device to transmit the user input data to the backend cloud component or other associated system. Since the backend cloud component provided the code for the displayed interface for receiving the user input, it can use the information about the user interaction to determine what user interface elements were manipulated or interacted with. This information can then be validated, either by the backend cloud component or by a third-party platform. For example, a financial institution can be securely contacted to determine whether or not the user input was valid.

Based on verification of the user input, the action associated with the input is performed (514). For example, the application upon verification of the input can present information about the transaction, e.g., an indication that a request has been sent, presentation of confirmation information, or other information associated with the user request. In some implementations, the auxiliary computing device performs the verification and then directly transmits transaction information to a third-party platform. The application can then receive information indicating that the transaction is complete.

The system can perform other actions associated with the requested, for example, logging in the user and providing information to the application for display. The third-party system can provide information back to the application on the host device for updating a user interface provided by the application, for example, displaying additional information in response to a successful logon, a confirmation of a transaction, or an error message when authentication is unsuccessful.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving, at a secure runtime environment associated with an application executing on a user device associated with a user, a request from the application for particular user input;
   providing the request to a remote location, wherein the remote location is assigned a first level of trust and the secure runtime environment is assigned a second level of trust that is lower than the first level of trust, wherein each level of trust is assigned based on physical access by an adversary, wherein the remote location does not trust the user device, and wherein the remote location requires the secure runtime environment to prove its identity uniquely on each interaction with the remote location;

receiving, from the remote location and at the user device, code executable by display hardware to render a user interface configured to receive the user input, wherein the received code is not contextually readable by the secure runtime environment such that the secure runtime environment does not obtain information about content of the rendered user interface;

passing the received code to the display hardware to render the user interface on a display;

capturing information at the secure runtime environment identifying particular display locations to which the user provided input on the rendered user interface, wherein the secure runtime environment does not have information needed to map the captured information to the content of the rendered user interface; and providing the captured information to the remote location, wherein the remote location maps the captured information to known user interface information to determine the user input.

2. The method of claim 1, wherein the secure runtime environment is instantiated on the user device, and wherein the secure runtime environment communicates the request to the remote location.

3. The method of claim 1, wherein the content of the rendered user interface comprises one or more alphanumeric characters in a layout unknown to the secure runtime environment, and wherein the user input corresponds to an identifier only known to the user and that allows the user to access features provided by the application.

4. The method of claim 1, wherein the secure runtime environment is an emulated environment having an instruction set architecture different from the instruction set architecture of the user device.

5. The method of claim 1, further comprising:
receiving confirmation information from the remote location, the confirmation information being provided to confirm completion of a transaction.

6. A method comprising:
receiving, at a secure runtime environment associated with an application executing on a user device associated with a user, a request from the application for particular user input;

providing the request to a remote location, wherein the remote location is assigned a first level of trust and the secure runtime environment is assigned a second level of trust that is lower than the first level of trust, wherein each level of trust is assigned based on physical access by an adversary, wherein the remote location does not trust the user device, and wherein the remote location requires the secure runtime environment to prove its identity uniquely on each interaction with the remote location;

receiving, from the remote location and at the user device, code executable by display hardware to render a user interface configured to receive the user input, wherein the received code is not meaningfully readable by the secure runtime environment such that the secure runtime environment does not obtain information about content of the rendered user interface;

capturing information at the secure runtime environment identifying particular display device locations to which the user provided input on the rendered user interface, wherein the secure runtime environment does not have information needed to map the captured information to the content of the rendered user interface; and providing a representation of the captured information to an auxiliary computing device for validation of the user input.

7. The method of claim 6, wherein the secure runtime environment is instantiated by the application, and wherein the secure runtime environment communicates the request to the remote location.

8. The method of claim 6, wherein the received code, though not meaningfully readable by the secure runtime environment, enables user interface content and provides a display of one or more alphanumeric characters in a non-fixed layout, and wherein the user input corresponds to a unique user identifier for authentication to access features provided by the application.

9. The method of claim 6, wherein the secure runtime environment is an emulated environment having an instruction set architecture different from the instruction set architecture of the user device.

10. The method of claim 6, wherein providing the representation of the captured information to the auxiliary computing device includes a software component that is an only entity capable of interpreting security information in a received payload to extract sensitive data entered by the user and that is needed by other systems for completing a transaction.

11. A system comprising:
a user device having one or more processors and one or more storage devices storing a compiled program, that when executed by the one or more processors, causes the user device to perform operations comprising:

in response to a request from an application executing on the user device for particular user input, providing the request to a remote location;

receiving, within a secure runtime environment, executable code to render a user interface configured to receive the user input, wherein the executable code is not contextually readable by the secure runtime environment such that the secure runtime environment does not obtain information about content of the rendered user interface, wherein the remote location is assigned a first level of trust and the secure runtime environment is assigned a second level of trust that is lower than the first level of trust, wherein each level of trust is assigned based on physical access by an adversary, wherein the remote location does not trust the user device, and wherein the remote location requires the secure runtime environment to prove its identity uniquely on each interaction with the remote location;

rendering the user interface on a display device of the user device;

capturing information at the secure runtime environment identifying one or more particular display device locations to which a user of the user device provided input on the rendered user interface, wherein the secure runtime environment does not have information needed to map the captured information to the content of the rendered user interface; and providing the captured information to the remote location that evaluates integrity of a chain of custody tracking all interactions and flows involved from a point of receiving the request for user input and capturing the user input to the point of delivering the user input to an intended remote location.

12. The system of claim 11, wherein the secure runtime environment is instantiated on the user device upon request from the application when activated by the user, and wherein the secure runtime environment communicates the request to the remote location.

13. The system of claim 11, wherein the content presented in the rendered user interface provides a display of one or more alphanumeric characters in a particular layout, and wherein the user input corresponds to a unique user identifier for authentication to access features provided by the application and secured by the secure runtime environment.

14. The system of claim 11, wherein the secure runtime environment is an emulated environment having an instruction set architecture different from the instruction set architecture of the user device.

15. The system of claim 11, further comprising:
receiving confirmation information from the remote location, the confirmation information being provided to confirm completion of a transaction.

16. A system comprising:
a user device having one or more processors and one or more storage devices storing instructions, that when executed by the one or more processors, cause the user device to perform operations comprising:
receiving, at a secure runtime environment associated with an application, a request from that application executing on the user device for particular user input;
providing the request to a remote location, wherein the remote location is assigned a first level of trust and the secure runtime environment is assigned a second level of trust that is lower than the first level of trust, wherein each level of trust is assigned based on physical access by an adversary, wherein the remote location does not trust the user device, and wherein the remote location requires the secure runtime environment to prove its identity uniquely on each interaction with the remote location;
receiving, from the remote location and at the user device, code executable by display hardware to render a user interface configured to receive the user input, wherein the received code is not meaningfully readable by the secure runtime environment such that the secure runtime environment does not obtain information about content of the rendered user interface;
rendering the user interface on a display device of the user device;
capturing metadata at the secure runtime environment describing user input on the rendered user interface, wherein the secure runtime environment does not have information needed to map the captured metadata to the content of the rendered user interface; and
providing a representation of the captured metadata to an auxiliary computing device for extracting contextualized user input.

17. The system of claim 16, wherein the secure runtime environment is instantiated on the user device, and wherein the secure runtime environment communicates the request to the remote location.

18. The system of claim 16, wherein the content of the rendered user interface provides a display of one or more alphanumeric characters in a layout unknown to the secure runtime environment, and wherein the user input corresponds to a unique user identifier for authenticating access to features provided by the application.

19. The system of claim 16, wherein the secure runtime environment is an emulated environment having an instruction set architecture different from the instruction set architecture of the user device.

20. The system of claim 16, wherein providing the representation of the captured metadata to the auxiliary computing device includes providing a representation of a user interaction with the display device to enter sensitive information as well as cryptographic evidence indicating that the user interaction was not modified by an unauthorized actor.

\* \* \* \* \*